US010248842B1

(12) United States Patent
Bardagjy et al.

(10) Patent No.: US 10,248,842 B1
(45) Date of Patent: Apr. 2, 2019

(54) FACE TRACKING USING STRUCTURED LIGHT WITHIN A HEAD-MOUNTED DISPLAY

(71) Applicant: Facebook Technologies, LLC, Menlo Park, CA (US)

(72) Inventors: Andrew Matthew Bardagjy, Fremont, CA (US); Joseph Duggan, San Francisco, CA (US); Cina Hazegh, Walnut Creek, CA (US); Fei Liu, San Jose, CA (US); Mark Timothy Sullivan, Mountain View, CA (US); Simon Morris Shand Weiss, Redwood City, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/866,186

(22) Filed: Jan. 9, 2018

(51) Int. Cl.
*G06T 7/521* (2017.01)
*G06K 9/00* (2006.01)
*G06T 13/40* (2011.01)
*G06K 9/20* (2006.01)
*G06T 7/90* (2017.01)

(52) U.S. Cl.
CPC ..... *G06K 9/00255* (2013.01); *G06K 9/00302* (2013.01); *G06K 9/2027* (2013.01); *G06T 7/521* (2017.01); *G06T 7/90* (2017.01); *G06T 13/40* (2013.01); *G06T 2207/10024* (2013.01); *G06T 2207/10028* (2013.01); *G06T 2207/10152* (2013.01); *G06T 2207/30201* (2013.01)

(58) Field of Classification Search
CPC ........... G06K 9/00302; G06K 9/00671; G06K 9/00255; G06K 2207/30201; G06K 3/011; G06K 19/006; G06K 7/00
See application file for complete search history.

(56) References Cited

U.S. PATENT DOCUMENTS

| 7,606,392 | B2 * | 10/2009 | Gordon | G06T 7/246 |
|  |  |  |  | 382/103 |
| 2011/0050859 | A1 * | 3/2011 | Kimmel | G01B 11/2509 |
|  |  |  |  | 348/50 |

* cited by examiner

*Primary Examiner* — Antonio A Caschera
(74) *Attorney, Agent, or Firm* — Fenwick & West LLP

(57) ABSTRACT

A head mounted display (HMD) displays content to a user wearing the HMD, where the content may be based on a facial model of the user. The HMD uses an electronic display to illuminate a portion of the face of the user with. The electronic display emits a pattern of structured light and/or monochromatic light of a given color. A camera assembly captures images of the illuminated portion of the face. A controller processes the captured images to determine depth information or color information of the face of the user. Further, the processed images may be used to update the facial model, for example, which is represented as a virtual avatar and presented to the user in a virtual reality, augmented reality, or mixed reality environment.

14 Claims, 6 Drawing Sheets

US 10,248,842 B1

FACE TRACKING USING STRUCTURED LIGHT WITHIN A HEAD-MOUNTED DISPLAY

BACKGROUND

The present disclosure generally relates to head-mounted displays (HMDs), and specifically relates to facial tracking using structured light within a HMD.

Virtual reality (VR) and augmented reality (AR) systems typically include a display screen that presents content, which may depict elements such as objects and users of the systems. Existing HMDs may include one or more cameras to track the user or environment surrounding the HMD. Furthermore, depth cameras can use structured light to determine facial data of the user. In a virtual or augmented environment, users can be represented by an avatar generated using facial data. Structured light depth cameras can use an active illumination source to project patterns of structured light onto the user's face. However, existing systems that track facial data of users may require dedicated hardware for an active illumination source such as a structured light projector. Since the structured light projector contributes additional weight and bulk, it is challenging to provide a facial tracking system that is suitable for use in a portable, lightweight, and high-performance HMD.

SUMMARY

A head mounted display (HMD) displays content to a user wearing the HMD. The HMD uses an electronic display to illuminate a portion of the face of the user inside the HMD. The electronic display may illuminate the face using structured light having a pattern of monochrome colors (e.g., red, green, blue, etc.). In some embodiments, the structured light is emitted along with other content displayed to the user, e.g., embedded into an image or video. In other embodiments, the structured light is emitted separately from other content. A camera assembly captures images of the illuminated portion of the face. A controller processes the captured images to determine facial data such as depth information or color information of the face of the user.

The facial data may be used to update portions of a face of a virtual avatar of the user. For example, the user views the virtual avatar when using the HMD, and thus experiences an immersive artificial reality experience. Other HMDs may display content to other users, where the content may be based in part on the facial data. The facial data can also be used to track an eye of the user wearing the HMD or determine an eye color. Since the HMD uses the electronic display to both display content and illuminate the user's face, the HMD does not necessarily require additional hardware such as a structured light projector. This may be advantageous because, e.g., the HMD may be more compact, lightweight, and/or require less computational resources.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a 3D effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

A HMD uses an electronic display to illuminate the face of the user wearing the HMD, as well as display content to the user. Thus, the HMD does not necessarily require additional hardware such as a structured light projector to capture images of the user. The electronic display may illuminate the face using structured light having a pattern of monochrome colors (e.g., red, green, blue, etc.). The light may be emitted simultaneously or separately from the display of other by the electronic display. A controller processes images of the face captured by a camera assembly to determine facial data (e.g., depth information or color information), which may be used to update a virtual avatar of the user.

Head-Mounted Display

Figure 1:
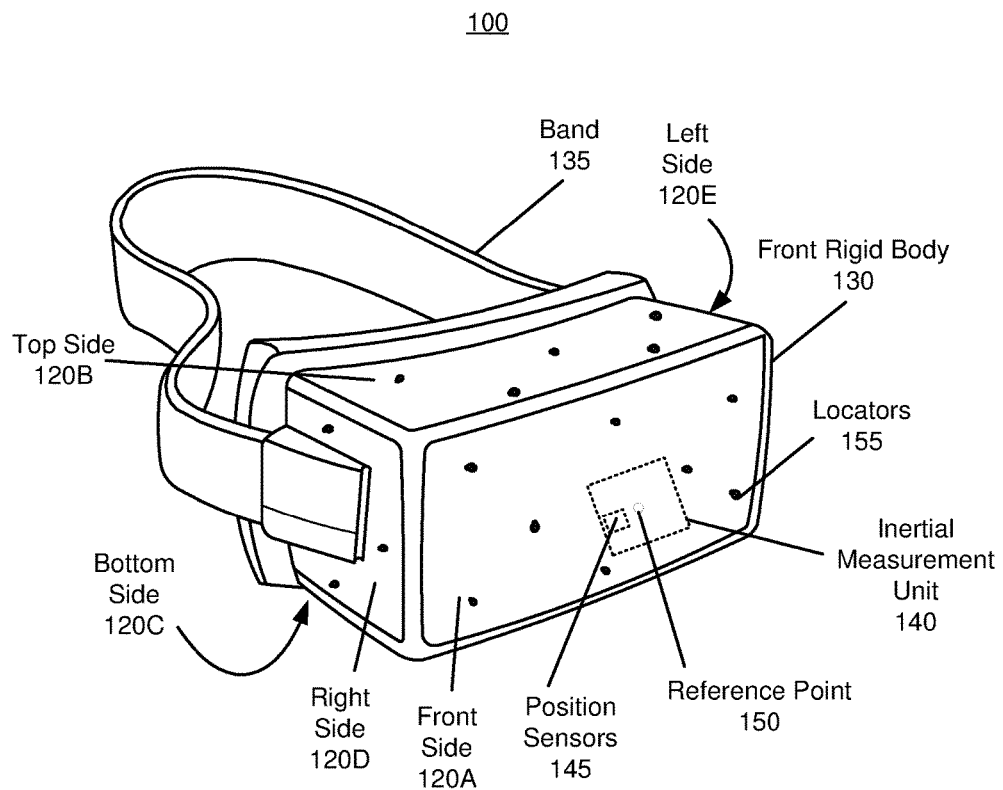
FIG. 1 is a wire diagram of a view of a HMD, in accordance with one or more embodiments.

FIG. 1 is a wire diagram of a view of a HMD 100, in accordance with one or more embodiments. The HMD 100 is a head-mounted display that presents content to a user comprising virtual and/or augmented views of a physical, real-world environment with computer-generated elements (e.g., 2D or 3D images, 2D or 3D video, sound, etc.). Examples of media presented by the HMD 100 include one or more images, video, audio, or some combination thereof. In some embodiments, audio is presented via an external device (e.g., speakers and/or headphones) that receives audio information from the HMD 100 and presents audio data based on the audio information.

The HMD 100 may be part of an artificial reality system. In some embodiments portions of the HMD 100 that are between a front side 120A of the HMD 100 and an eye of the user are at least partially transparent (e.g., a partially transparent electronic display). In addition to the front side 120A, the HMD 100 also includes a top side 120B, a bottom side 120C, a right side 120D, a left side 120E, a front rigid body 130, and a band 135. The front rigid body 130 also includes an inertial measurement unit (IMU) 140, one or more position sensors 145, a reference point 150, and one or more locators 155. In the embodiment shown by FIG. 1, the position sensors 145 are located within the IMU 140, and neither the IMU 140 nor the position sensors 145 are visible to the user. The HMD 100 further includes a facial tracking system, which is further described below with reference to FIG. 3.

The IMU 140 is an electronic device that generates IMU data based on measurement signals received from one or more of the position sensors 145. A position sensor 145 generates one or more measurement signals in response to motion of the HMD 100. Examples of position sensors 145 include: one or more accelerometers, one or more gyroscopes, one or more magnetometers, another suitable type of sensor that detects motion, a type of sensor used for error correction of the IMU 140, or some combination thereof. The position sensors 145 may be located external to the IMU 140, internal to the IMU 140, or some combination thereof. Based on the one or more measurement signals from one or more position sensors 145, the IMU 140 generates IMU data indicating an estimated position of the HMD 100 relative to an initial position of the HMD 100. The reference point 150 is a point that may be used to describe the position of the HMD 100. While the reference point 150 may generally be defined as a point in space, in practice the reference point 150 is defined as a point within the HMD 100, e.g., the center of the IMU 140.

The locators 155 are located in fixed positions on the front rigid body 130 relative to one another and relative to the reference point 150. Thus, the locators 155 can be used to determine positions of the reference point 150 and the HMD 100. As shown in FIG. 1, the locators 155, or portions of the locators 155, are located on a front side 120A, a top side 120B, a bottom side 120C, a right side 120D, and a left side 120E of the front rigid body 130. A locator 155 may be a light emitting diode (LED), a corner cube reflector, a reflective marker, a type of light source that contrasts with an environment in which the HMD 100 operates, or some combination thereof. In embodiments where the locators 155 are active (e.g., an LED or other type of light emitting device), the locators 155 may emit light in the visible band (~380 nanometer (nm) to 750 nm), in the infrared (IR) band (~750 nm to 1700 nm), in the ultraviolet band (10 nm to 380 nm), some other portion of the electromagnetic spectrum, or some combination thereof.

In some embodiments, the locators 155 are located beneath an outer surface of the HMD 100, which is transparent to the wavelengths of light emitted or reflected by the locators 155 or is thin enough not to substantially attenuate the wavelengths of light emitted or reflected by the locators 155. Additionally, in some embodiments, the outer surface or other portions of the HMD 100 are opaque in the visible band of wavelengths of light. Thus, the locators 155 may emit light in the IR band under an outer surface that is transparent in the IR band but opaque in the visible band.

Figure 2:
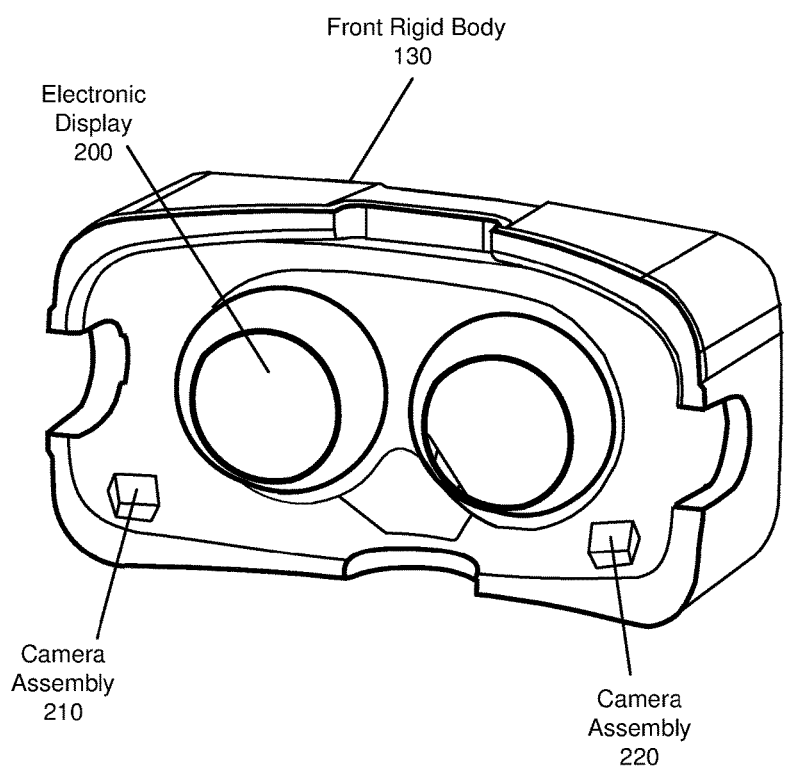
FIG. 2 is a wire diagram of another view of the HMD shown in FIG. 1, in accordance with one or more embodiments.

FIG. 2 is a wire diagram of another view of the HMD 100 shown in FIG. 1, in accordance with one or more embodiments. In the embodiment shown in FIG. 2, the front rigid body 130 include an electronic display 200, camera assembly 210, and camera assembly 220. Camera assemblies 210 and 220 each include one or more sensors located outside the direct line of sight of a user wearing the HMD 100. To capture images of the face of a user, the sensors detect light reflected off the user, and at least some of the detected light may have originated from the electronic display 200. The camera assembly 210 is located on the left side of the front rigid body 130, and the camera assembly 220 is located on the right side of the front rigid body 130 from the perspective of the user. In other embodiments, the HMD 100 may include any number of camera assemblies, which may be positioned at different locations within the HMD 100.

Figure 6:
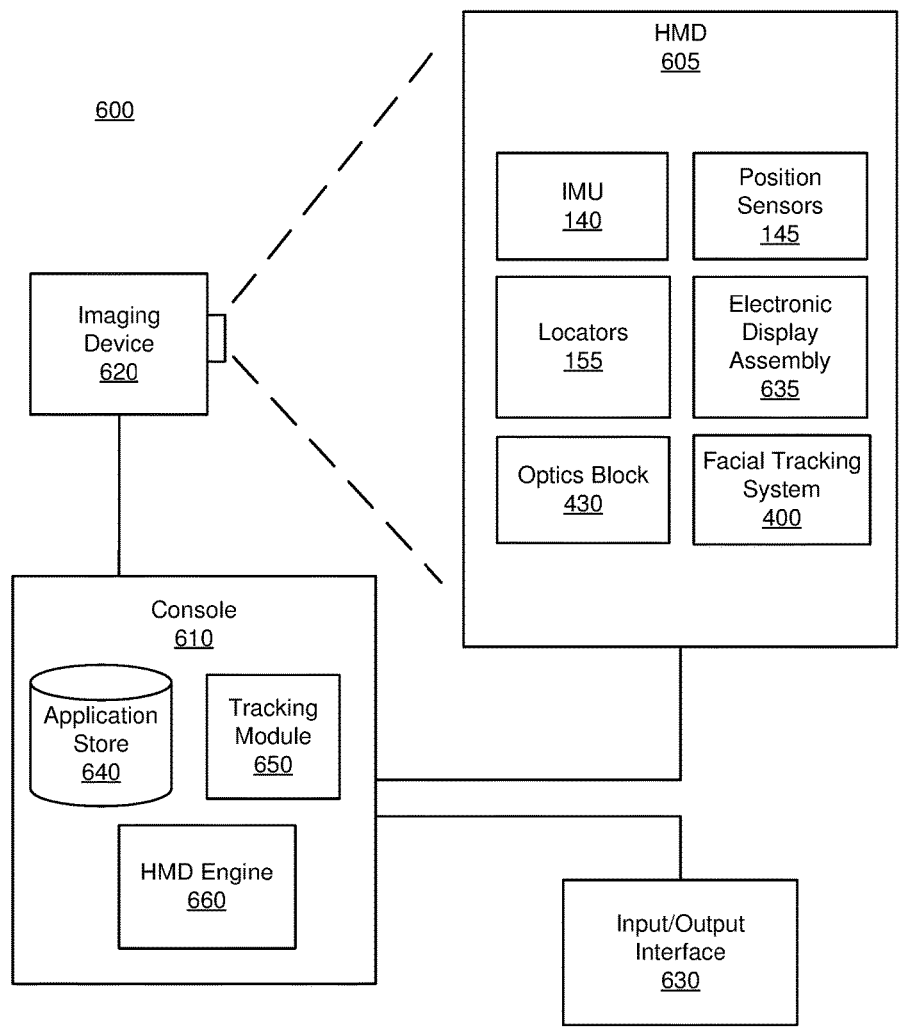
FIG. 6 is a HMD system in accordance with one or more embodiments.

The electronic display 200 displays content (e.g., images or video) to the user in accordance with data received from a console (e.g., the console shown in FIG. 6). In various embodiments, the electronic display 200 may include a single display element or multiple display elements (e.g., a display for each eye of a user). Examples of the electronic display 200 include: a liquid crystal display (LCD), an organic light emitting diode (OLED) display, an active-matrix organic light-emitting diode display (AMOLED), some other display, or some combination thereof. Though not shown in FIG. 2, the HMD 100 may also include an optics block. The optics block may be positioned such that at least some light emitted by the electronic display 200 passes through the optics block before reaching the eyes of a user wearing the HMD 100.

Facial Tracking System

Figure 3:
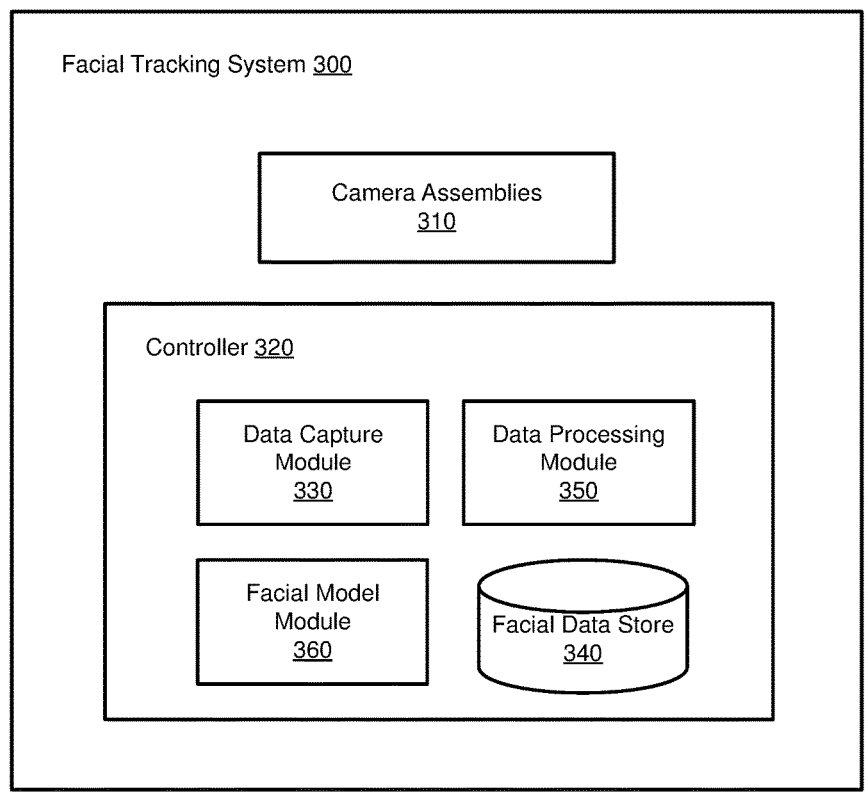
FIG. 3 is a block diagram of a facial tracking system, in accordance with one or more embodiments.

FIG. 3 is a block diagram of a facial tracking system 300, in accordance with one or more embodiments. The facial tracking system 300 tracks portions of a face of a user (e.g., including eyes of the user). The portions of the face are, for example, portions of the face covered by the HMD 100 worn by the user. In the example shown in FIG. 3, the facial tracking system 300 includes one or more camera assemblies 310 and a controller 320. In some embodiments, the controller 320 is part of the facial tracking system 300, and thus also part of the HMD 100. In other embodiments, some or all components of the controller 320 is outside of the HMD 100, e.g., the controller 320 is included as part of a console (e.g., the console shown in FIG. 6). In other embodiments, different and/or additional components may be included in the facial tracking system 300.

The camera assemblies 310 capture images of the user using detected light, which may include structured light or monochromatic light of different colors. The light may originate from an electronic display, e.g., electronic display 200 shown in FIG. 2. The camera assemblies 310 are communicatively coupled to the controller 320 and provide captured images to the controller 320. The camera assemblies 210 and 220 shown in FIG. 2 are embodiments of camera assemblies 310. A camera assembly may include one or more types of cameras, for example, RGB cameras, infrared cameras, depth sensors, etc.

The controller 320 controls the facial tracking system 300. The controller 320 includes a data capture module 330, facial data store 340, a data processing module 350, and a facial model module 360. In other embodiments, different and/or additional components may be included in the controller 320. The controller 320 is communicatively coupled to the electronic display 200 and the camera assemblies 310. In some embodiments, the controller 320 is also communicatively coupled to other components outside of the HMD 100, e.g., an online system via the Internet or another type of network.

The data capture module 330 receives images captured by the camera assemblies 310. The data capture module 330 transmits instructions to the electronic display 200 to illuminate portions of a face of the user inside the HMD 100. The data capture module 330 may generate an instruction based on a particular type of illumination. For example, an instruction for flood illumination may indicate that all pixels emit a certain color(s). As another example, an instruction may indicate a given type of structured light pattern, which may or may not be interleaved with content frames. In some embodiments, the data capture module 330 generates an instruction for one or more pixels to illuminate portions of the face for a period of time that is too short for the user to perceive (e.g., by a human eye). The data capture module 330 also transmits instructions to one or more camera assemblies 310 to capture one or more image frames of the illuminated portions of the face. The facial tracking system 300 may use the captured images for a calibration process to determine features of the user's face or to update a facial model of the user. Accordingly, light emitted by the electronic display 200 to illuminate the face for image capture (in contrast to light for displaying other content by the HMD 100) may also be referred to as "illumination light." The data capture module 330 may store captured images in the facial data store 340 and/or any other database on or off of the HMD 100 that the facial tracking system 300 can access.

In an embodiment, the data capture module 330 may coordinate the instructions to the electronic display 200 and camera assemblies 310. For instance, responsive to an instruction, the electronic display 200 emits illumination light for a period of time. The illumination light is for illuminating a portion of a face of a user for image capture. The illumination light may include one or more types of a broad range of light, for example, light having a certain monochrome color, a pattern of structured light, some other type of light, or some combination thereof. Responsive to another instruction, the data capture module 330 captures an image the user's face illuminated by the illumination light during the same period of time. Thus, the data capture module 330 may associate captured images with attributes of the illumination light (e.g., the certain monochrome color and/or pattern of structured light) that illuminated the face. Structured light patterns may be in color, in grayscale, or monochromatic, and include, e.g., strips, checkerboards, circles/ellipses, binary codes, dot arrays, speckle, among other types of patterns. In some embodiments, the illumination light is non-visible to a human eye (e.g., infrared light). Thus, the electronic display 200 may emit illumination light for longer periods of time without disrupting a user's perception of other content displayed by the electronic display 200. For instance, the electronic display 200 may emit illumination light whenever the HMD 100 is turned on or executing an application.

In some embodiments, the data capture module 330 transmits instructions to the electronic display 200 to sequentially illuminate the face with illumination light having monochromatic light of different colors, e.g., red, green, blue, etc. The sequence may be based on a predetermined order or pattern of repeating multiple colors. To avoid distracting the user, the electronic display 200 may cycle through a sequence of colors at a higher frame rate that is not perceivable by the human eye or difficult to perceive by the human eye. The higher frame rate may be greater than a lower frame rate at which the electronic display 200 displays other content to the user. In some embodiments, the electronic display 200 may emit illumination light having monochromatic light and/or structured light patterns at a different light intensity than that of other content displayed to the user. The electronic display 200 may emit illumination light in a different frame (e.g., period of time) than when other light is emitted for displaying content to the user. For example, the electronic display 200 displays content during a content frame and emits the illumination light during a projection frame. The projection frame may be between content frames, and different frames may vary in duration of time. In an embodiment, the data capture module 330 sends instructions for the electronic display 200 to emit the illumination light embedded with other light for displaying content. In particular, the illumination light may be embedded in a video that is presented before, during, or after certain content of an application of the HMD 100, e.g., during an initial period while the application is loading. Additionally, the illumination light may be embedded in a video such that the illumination light is periodically emitted at a given time interval, e.g., for updating facial data. In some embodiments, the illumination light is emitted for a period of time that is too short for a human eye to perceive.

The facial data store 340 stores data recorded by, generated by, or otherwise used by the facial tracking system 330. Stored data may include, for example, captured images, facial data, eye tracking information, color representation of a face (e.g., skin tone color), facial depth data, calibration parameters, facial animation information, some other information used for facial tracking, or some combination thereof. Calibration parameters may include information about landmarks of the user's face or baseline facial data, e.g., according to aggregate facial data from a population of users. For instance, the calibration parameters indicate an expected shape, dimension, or skin tone color of the face of a given user based on demographic data of the given user. The calibration parameters may be used to generate facial models or avatars of users. The facial data store 340 may store information retrieved from a source outside of the facial tracking system 300, e.g., from an online source or the console shown in FIG. 6. Other modules of the facial tracking system 330 can store information to the facial data store 340 and/or retrieve information from the facial data store 340.

The data processing module 350 determines facial data by processing images from the data capture module 330. The data processing module 350 may process an image using corresponding attributes of light (emitted at least in part by the electronic display 200) that illuminated a face of a user captured in the image. Facial data may include, e.g., color representations, facial depth data, or other types of information describing faces of users. In some embodiments, the data processing module 350 determines a color representation of the face by aggregating captured images of a user's face illuminated by monochromatic light having different colors, e.g., where each image corresponds to a different one of the colors. The color representation may describe a skin tone color of the user, and the color representation may vary between different portions of the face to provide a more accurate representation of the face of the user in real life.

In some embodiments, the data processing module 350 determines facial depth data of the face of the user by using captured images of the face illuminated by structured light or monochromatic light having different colors. The data processing module 350 may generate a depth map of the face by processing the images with a known pattern of the structured light, or a known pattern of the monochromatic light. In an example use case where the structured light pattern includes parallel lines in 2D, the structured light emitted by the electronic display 200 becomes distorted on the face because the face has 3D features (e.g., the noise protrudes from the surface of the face). The camera assemblies 310 may capture these distortions from multiple angles (e.g., the left and right sides of the HMD 100 as shown in FIG. 2). Thus, the data processing module 350 may use triangulation or other mapping techniques to determine distances (e.g., depths) between the camera assemblies 310 and particular points on the face in a 3D coordinate system. By aggregating the distances, the data processing module 350 generates the depth map that describes the user's facial features, e.g., a contour of the user's noise, mouth, eyes, cheek, edge of the face, etc., in 3D space. The resolution of the depth map may be based on the resolution of the corresponding structured light pattern emitted by the electronic display 200. In some embodiments, the data processing module 350 aggregates images captured over a duration of time to generate a depth map that is a spatiotemporal model. The spatiotemporal model describes changes in the captured facial features, e.g., indicating facial expressions.

The facial model module 360 generates facial models of users of the HMD 100 using facial data determined by the data processing module 350. In some embodiments, the facial model module 360 uses color representation and/or depth map of a user's face to generate a virtual face of a user wearing the HMD 100. Furthermore, the facial model module 360 may use the virtual face to generate or update an avatar of the user. By customizing the avatar to mirror the user's facial features and skin tone color, the avatar helps provide an immersive VR/AR/MR experience for the user. In addition, the facial model module 360 may determine facial expressions (e.g., smiling, frowning, winking, talking, etc.) and update the facial model or avatar to including animations that reflect the facial expressions. The facial model module 360 may provide the avatar or other content generated based on the facial model to the electronic display 200 of the HMD 100 for presentation to the user. The facial tracking system 300 may also store the facial model in the facial data store 340 for future use.

Figure 4:
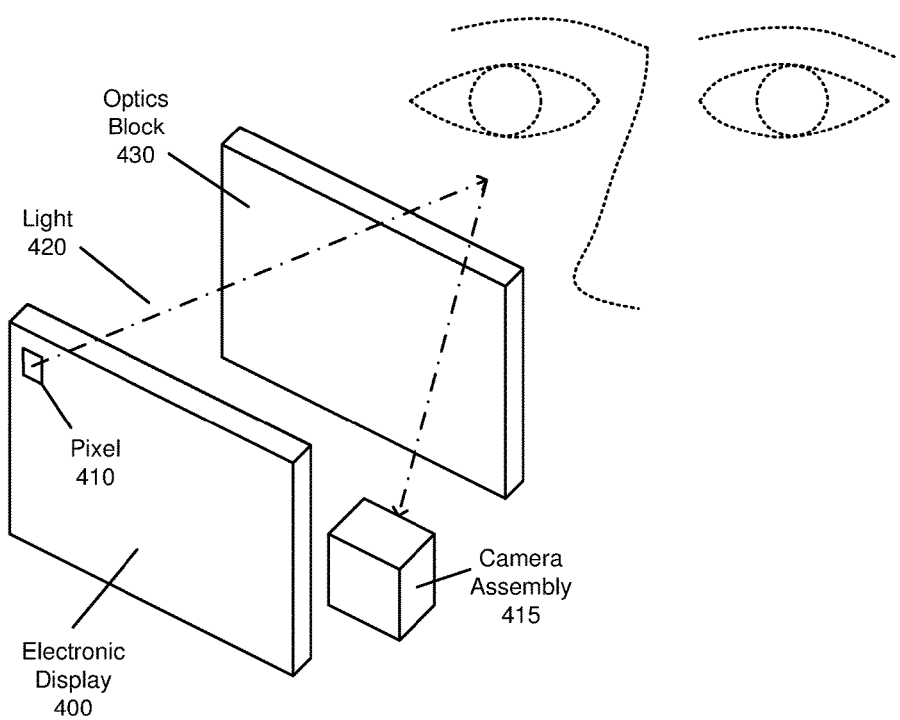
FIG. 4 is a diagram of capturing light by a facial tracking system, in accordance with one or more embodiments.

FIG. 4 is a diagram of capturing light by the facial tracking system 300, in accordance with one or more embodiments. As shown in FIG. 4, a pixel 410 of an electronic display element 400 emits light 420 toward an optics block 430. In some use cases, the electronic display 400 and camera assembly 415 are embodiments of the electronic display 200 and camera assembly 215, respectively, of the HMD 100 shown in FIG. 2. In other embodiments, the electronic display 400 and camera assembly 415 are not necessarily part of the HMD 100 or another HMD. The optics block 430 may magnify the emitted light 420, and in some embodiments, also correct for one or more additional optical errors (e.g., distortion, astigmatism, etc.). Further, the optics block 430 directs the altered (e.g., corrected) light 420 to the face of a user. The light 420 may include image light and/or illumination light for determining facial data. Illumination light may be directed to any portion of the face of the user inside of a HMD, including the eyes, cheek, noise, forehead, mouth, chin, etc. Image light is displayed for presenting content to the user and may be directed to an exit pupil, for example, the location of the front rigid body 130 of the HMD 100 (e.g., shown in FIGS. 1-2) where an eye of a user wearing the HMD 100 is positioned.

In some embodiments, the electronic display 400 emits illumination light using a subset of pixels of the electronic display 400. For example, the subset of pixels may be positioned at a corner of the electronic display 400 such that a user wearing a HMD (including the electronic display 400) is less likely to notice the illumination light, or perceives the illumination light to a lesser degree. The other pixels of the electronic display 400 may be used to display other content for applications of the HMD. In an embodiment, the subset of pixels may emit the illumination light at a different frame rate than that of another subset of pixels displaying other content to the user. Furthermore, the subset of pixels for emitting illumination light may change over time. For instance, the facial tracking system 300 transmits instructions to the electronic display 400 to cycle through a rotation of different subsets of pixels (e.g., positioned on the top right corner, top left corner, bottom left corner, and bottom right corner of the electronic display 400). In some embodiments, one or more pixels of the electronic display 400 emit illumination light for a period of time that is too short for a human eye to perceive.

In an embodiment, the optics block 430 includes one or more optical elements and/or combinations of different optical elements. For example, an optical element is an aperture, a Fresnel lens, a convex lens, a concave lens, a filter, or any other suitable optical element that affects the image light emitted from the electronic display 200. In some embodiments, one or more of the optical elements in the optics block 430 may have one or more coatings, such as anti-reflective coatings. Magnification of the light by the optics block 430 allows the electronic display 200 to be physically smaller, weigh less, and consume less power than larger displays. Additionally, magnification may increase a field of view of the displayed content. For example, the field of view of the displayed content is such that the displayed content is presented using almost all (e.g., 110 degrees diagonal), and in some cases all, of the user's field of view. In some embodiments, the optics block 430 is designed so its effective focal length is larger than the spacing to the electronic display 200, which magnifies the image light projected by the electronic display 200. Additionally, in some embodiments, the amount of magnification is adjusted by adding or removing optical elements.

Process Flow

Figure 5:
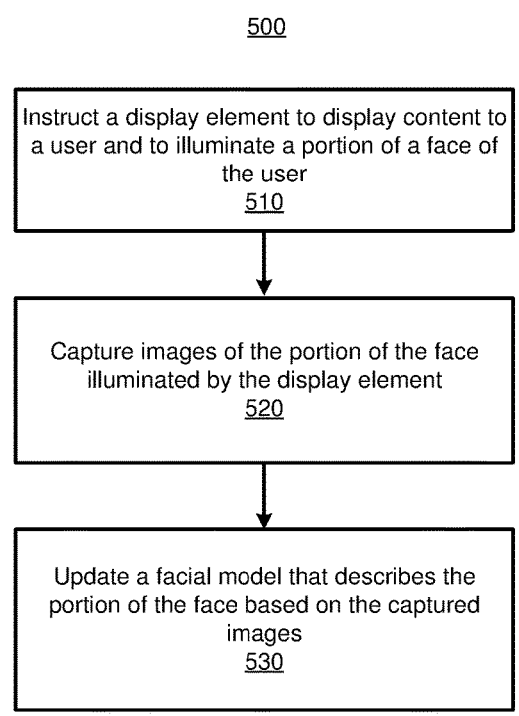
FIG. 5 is a flow chart illustrating a process for updating a facial model, in accordance with one or more embodiments.

FIG. 5 is a flow chart illustrating a process 500 for updating a facial model, in accordance with one or more embodiments. The process 500 is performed by the facial tracking system 300 described in conjunction with FIG. 3. Alternatively, other components may perform some or all of the steps of the process 500. For example, in some embodiments, a HMD 100 and/or a console may perform some of the steps of the process 500. Additionally, the method may include different or additional steps than those described below in conjunction with FIG. 5. In some embodiments, steps of the method may be performed in different orders than the order described in conjunction with FIG. 5.

The facial tracking system 300 instructs 510 a display element (e.g., pixels of the electronic display 200 of FIG. 2 or electronic display 400 of FIG. 4) to display content to a user and to illuminate a portion of a face of the user. The display element may be part of a HMD (e.g., HMD 100 of FIG. 1) worn by the user, where the portion of the face is inside the HMD. In some embodiments, responsive to one or more instructions from the facial tracking system 300, the display element illuminates the face with monochromatic light (and/or structured light) between different content frames. For example, the display element displays the content to the user for a content frame having a first time period. The display element emits monochromatic light for a second time period after the first time period has elapsed, and prior to display of additional content for a subsequent content frame. In other embodiments, the display element illuminates the face with monochromatic light simultaneously with displaying the content for a content frame (e.g., embedded into an image or video).

The facial tracking system 300 captures 520 images of the portion of the face illuminated by the display element. The facial tracking system 300 captures the images using, e.g., one or more camera assemblies.

The facial tracking system 300 updates 530 a facial model that describes the portion of the face based at least in part on the captured images. In some embodiments, the facial tracking system 300 determines a color representation of the portion of the face using the captured images, and updates the facial model with the color representation. In some embodiments, the facial tracking system 300 determines facial depth data using a captured image of the face illuminated by a structured light pattern. Furthermore, the facial tracking system 300 may update a virtual face of an avatar of the user using the facial model of the user.

System

FIG. 6 is a HMD system 600 in accordance with one or more embodiments. The HMD system 600 may operate in an artificial reality environment. The HMD system 600 shown by FIG. 6 comprises a console 610 coupled to a HMD 605, an imaging device 620, and an input/output (I/O) interface 630. While FIG. 6 shows an example HMD system 600 including one HMD 605 and one input interface 630, in other embodiments any number of these components may be included in the HMD system 600. For example, there may be multiple HMDs, each having an associated input interface 630 and communicating with the HMD console 610. In alternative configurations, different and/or additional components may be included in the HMD system 600. Similarly, functionality of one or more of the components can be distributed among the components in a different manner than is described here. For example, some or all of the functionality of the HMD console 610 may be contained within the HMD 605.

The HMD 605 may act as an artificial reality HMD. The HMD 605 presents content to a user. In some embodiments, the HMD 100 is an embodiment of the HMD 605. Example content includes images, video, audio, or some combination thereof. Audio content may be presented via a separate device (e.g., speakers and/or headphones) external to the HMD 605 that receives audio information from the HMD 605, the console 610, or both. The HMD 605 includes an electronic display assembly 635, the optics block 430, one or more locators 155, the position sensors 145, the internal measurement unit (IMU) 140, and the facial tracking system 400.

The electronic display assembly 635 displays 2D or 3D images to the user in accordance with data received from the console 610. In various embodiments, the electronic display assembly 635 comprises a single electronic display (e.g., the electronic display 200, or the electronic display 400) or multiple electronic displays (e.g., a display for each eye of a user). Examples of the electronic display include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a waveguide display, some other display, or some combination thereof.

Based on the measurement signals from the position sensors 145, the IMU 140 generates IMU data indicating an estimated position of the HMD 605 relative to an initial position of the HMD 605. For example, the position sensors 145 include multiple accelerometers to measure translational motion (forward/back, up/down, left/right) and multiple gyroscopes to measure rotational motion (e.g., pitch, yaw, and roll). The IMU 140 can, for example, rapidly sample the measurement signals and calculate the estimated position of the HMD 605 from the sampled data. For example, the IMU 140 integrates measurement signals received from the accelerometers over time to estimate a velocity vector and integrates the velocity vector over time to determine an estimated position of a reference point on the HMD 605. The reference point is a point that may be used to describe the position of the HMD 605. While the reference point may generally be defined as a point in space, in various embodiments, a reference point is defined as a point within the HMD 605 (e.g., a center of the IMU 140). Alternatively, the IMU 140 provides the sampled measurement signals to the console 610, which determines the IMU data.

The IMU 140 can additionally receive one or more calibration parameters from the console 610. As further discussed below, the one or more calibration parameters are used to maintain tracking of the HMD 605. Based on a received calibration parameter, the IMU 140 may adjust one or more of the IMU parameters (e.g., sample rate). In some embodiments, certain calibration parameters cause the IMU 140 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The facial tracking system 400 captures images of an illuminated portion of a face of a user wearing the HMD 605. The facial tracking system 400 illuminates the face using illumination light, which may include monochrome light and/or a pattern of structured light. In addition, the facial tracking system 400 may emit the illumination light simultaneously or separately from presentation of other content using the electronic display assembly 635 of the HMD 605. For example, a subset of subpixels of a display element of the electronic display assembly 635 emits the illumination light, and the remaining subpixels emit light for content frames. By the processing the captured images, the facial tracking system 400 can determine facial data such as color representations (e.g., skin tone) or depth data of the face of the user, which may be used to generate a virtual model and/or animations of the face for an avatar.

The imaging device 620 generates image data in accordance with calibration parameters received from the console 610. Image data includes one or more images showing observed positions of the locators 155 that are detectable by imaging device 620. The imaging device 620 includes one or more cameras, one or more video cameras, any other device capable of capturing images including one or more of the locators 155 of the HMD 605, or some combination thereof. Additionally, the imaging device 620 may include one or more filters (e.g., used to increase signal to noise ratio). The imaging device 620 is configured to detect light emitted or reflected from locators 155 in a field of view of the imaging device 620. In embodiments where the locators 155 include passive elements (e.g., a retroreflector), the imaging device 620 may include a light source that illuminates some or all of the locators 155, which retro-reflect the light towards the light source in the imaging device 620. The imaging device 620 may provide captured images or calibration parameters to the console 610. Moreover, the imaging device 620 may receive one or more calibration parameters from the console 610 to adjust one or more imaging parameters (e.g., focal length, focus, frame rate, ISO, sensor temperature, shutter speed, aperture, etc.).

The I/O interface 630 is a device that allows a user to send action requests to the console 610. An action request is a request to perform a particular action. For example, an action request may be to start or end an application or to perform a particular action within the application. The I/O interface 630 may include one or more input devices. Example input devices include a keyboard, a mouse, a game controller, or any other suitable device for receiving action requests and communicating the received action requests to the console 610. An action request received by the I/O interface 630 is communicated to the console 610, which performs an action corresponding to the action request. In some embodiments, the I/O interface 630 may provide haptic feedback to the user in accordance with instructions received from the console 610. For example, haptic feedback is provided by the I/O interface 630 when an action request is received, or the console 610 communicates instructions to the I/O interface 630 causing the I/O interface 630 to generate haptic feedback when the console 610 performs an action.

The console 610 provides content to the HMD 605 for presentation to a user in accordance with information received from one or more of: the imaging device 620, the HMD 605 (e.g., from the facial tracking system 400), and the input interface 630. In the example shown in FIG. 6, the console 610 includes an application store 640, a tracking module 650, and a HMD engine 660. Some embodiments of the console 610 have different modules than those described in conjunction with FIG. 6. Similarly, the functions further described below may be distributed among components of the console 610 in a different manner than is described here.

The application store 640 stores one or more applications for execution by the console 610. An application is a group of instructions, that when executed by a processor, generates content for presentation to the user. Content generated by an application may be in response to inputs received from the user via movement of the HMD 605 or the input interface 630. Examples of applications include: gaming applications, conferencing applications, video playback application, or other suitable applications.

The tracking module 650 calibrates the HMD system 600 using one or more calibration parameters and may adjust one or more calibration parameters to reduce error in determination of the position of the HMD 605. For example, the tracking module 650 adjusts the focus of the imaging device 620 to obtain a more accurate position for observed locators 155 on the HMD 605. Moreover, calibration performed by the tracking module 650 may also account for information received from the IMU 140. Additionally, if tracking of the HMD 605 is lost (e.g., the imaging device 620 loses line of sight of at least a threshold number of the locators 155), the tracking module 650 may re-calibrate at least some components of the HMD system 600.

Additionally, the tracking module 650 tracks the movement of the HMD 605 using image data from the imaging device 620 and determines positions of a reference point on the HMD 605 using observed locators from the image data and a model of the HMD 605. The tracking module 650 also determines positions of the reference point on the HMD 605 using position information from the IMU data from the IMU 140 on the HMD 605. Additionally, the tracking module 650 may use portions of the IMU data, the image data, or some combination thereof, to predict a future location of the HMD 605, which is provided to the console 610.

The HMD engine 660 executes applications within the HMD system 600. The HMD engine 660 receives position information, acceleration information, velocity information, predicted future positions, facial data, or some combination thereof from the HMD 605 and/or the tracking module 650. Using the received information, the HMD engine 660 determines content to provide to the HMD 605 for presentation to a user. In some embodiments, the HMD engine 660 performs an action within an application executing on the console 610 in response to an action request received from the input interface 630 and provides feedback to the user that the action was performed. The provided feedback may be visual or audible feedback via the HMD 605 or haptic feedback via the input interface 630.

In some embodiments, the HMD engine 660 generates facial animation information based on tracking information received from the HMD 605. In alternate embodiments, the HMD engine 660 receives facial animation information directly from the HMD 605 as part of the tracking information. For example, the HMD engine 660 receives facial data from the facial tracking system 400. Using the facial data, the HMD engine 660 generates a facial expression of an avatar and/or a virtual face of an avatar, including eye movements of the avatar, corresponding to a user wearing the HMD 605. For instance, a facial expression or eye movement of the avatar corresponds to a facial expression or eye movement that the user performs in real life. The HMD engine 660 may provide the virtual face for presentation to other users via electronic display assemblies of other HMDs. The other users (e.g., wearing the other HMDs) may be interacting with the user in an artificial reality environment, for instance, participating in a conversation, game, or another type of artificial reality application. By presenting the virtual face, the HMD engine 660 may provide a more immersive artificial reality experience for users.

Additional Configuration Considerations

The foregoing descriptions of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A head mounted display (HMD) comprising:
    a display element configured to:
        display content to a user wearing the HMD,
        sequentially illuminate a portion of a face of the user inside the HMD with monochromatic light of different colors, and
        wherein the content is displayed by the display element to the user for a content frame having a first time period, the monochromatic light being emitted for a second time period after the first time period has elapsed, and prior to display of additional content for a subsequent content frame; and
    an optics block configured to direct light from the display element to an exit pupil of the HMD;
    a camera assembly configured to:
        capture images of the portion of the face illuminated by the display element with the monochromatic light of different colors; and
    a controller configured to:
        update a facial model that describes the portion of the face based at least in part on the captured images including the monochromatic light of different colors.

2. The HMD of claim 1, wherein the monochromatic light is a structured light pattern.

3. The HMD of claim 1, wherein the controller is further configured to:
    determine a color representation of the portion of the face using the captured images of the portion of the face illuminated with the different monochromatic light; and
    update the facial model with the determined color representation.

4. The HMD of claim 1, wherein the display element illuminates the portion of the face using a structured light pattern, the captured images including an image of the face illuminated with the structured light pattern, the controller further configured to:
    generate facial depth data using the image of the face illuminated with the structured light pattern; and
    update the facial model using the facial depth data.

5. The HMD of claim 4, wherein the controller is further configured to:
    update a virtual face of an avatar of the user using the facial model of the user.

6. The HMD of claim 1, wherein the display element comprises a first subset of pixels and a second subset of pixels, the first subset of pixels displaying the content at a first frame rate, the second subset of pixels illuminating the portion of the face at a second frame rate different than the first frame rate.

7. The HMD of claim 1, wherein the display element is further configured to sequentially illuminate the face with monochromatic light of different colors in one or more structured light patterns, and the captured images include a set of images of the portion of the face illuminated with the different monochromatic light in the one or more structured light patterns, and the controller is further configured to:
    generate facial depth data using one or more of the set of images;
    determine a color representation of the portion of the face using some of the first set of images; and
    generate the facial model with the facial depth data and the determined color representation.

8. A method comprising:
    displaying, by a display element of a head mounted display (HMD), content to a user wearing the HMD, wherein the content is displayed by the display element to the user for a content frame having a first time period;
    sequentially illuminating, by the display element, a portion of a face inside the HMD with monochromatic light of different colors, wherein the monochromatic light is emitted for a second time period after the first time period has elapsed, and prior to display of additional content for a subsequent content frame;
    capturing, by a camera assembly of the HMD, images of the portion of the face illuminated by the display element with the monochromatic light of different colors;
    updating a facial model that describes the portion of the face based at least in part on the captured images including the monochromatic light of different colors and the cap.

9. The method of claim 8, wherein the monochromatic light is a structured light pattern.

10. The method of claim 8, further comprising:
    determining a color representation of the portion of the face using the captured images of the portion of the face illuminated with the monochromatic light; and
    updating the facial model with the determined color representation.

11. The method of claim 8, further comprising:
    illuminating, by the display element, the portion of the face using a structured light pattern, wherein the captured images include an image of the face illuminated with the structured light pattern;
    generating facial depth data using the image of the face illuminated with the structured light pattern; and
    updating the facial model using the facial depth data.

12. The method of claim 11, further comprising:
updating a virtual face of an avatar of the user using the facial model of the user.

13. The method of claim 8, wherein the display element comprises a first subset of pixels and a second subset of pixels, the first subset of pixels displaying the content at a first frame rate, the second subset of pixels illuminating the portion of the face at a second frame rate different than the first frame rate.

14. The method of claim 8, further comprising:
illuminating sequentially, by the display element, the face with monochromatic light of different colors in one or more structured light patterns, wherein the captured images include a set of images of the portion of the face illuminated with the monochromatic light in the one or more structured light patterns;
generating facial depth data using one or more of the set of images;
determining a color representation of the portion of the face using some of the first set of images; and
generating the facial model with the facial depth data and the determined color representation.

\* \* \* \* \*

UNITED STATES PATENT AND TRADEMARK OFFICE
CERTIFICATE OF CORRECTION

| | | |
|---|---|---|
| PATENT NO. | : 10,248,842 B1 | Page 1 of 1 |
| APPLICATION NO. | : 15/866186 | |
| DATED | : April 2, 2019 | |
| INVENTOR(S) | : Andrew Matthew Bardagjy et al. | |

It is certified that error appears in the above-identified patent and that said Letters Patent is hereby corrected as shown below:

In the Claims

Column 14, Lines 50 and 51, Claim 8, delete "colors and the cap." and insert -- colors. --

Signed and Sealed this
Ninth Day of July, 2019

Andrei Iancu
*Director of the United States Patent and Trademark Office*